United States Patent [19]

Mahdjuri

[11] 4,159,706

[45] Jul. 3, 1979

[54] SOLAR COLLECTOR COMPRISING AN EVACUATED ABSORBER COVER TUBE

[75] Inventor: Faramarz Mahdjuri, Aachen, Fed. Rep. of Germany

[73] Assignee: U.S. Philips Corporation, New York, N.Y.

[21] Appl. No.: 777,037

[22] Filed: Mar. 14, 1977

[30] Foreign Application Priority Data

Mar. 23, 1976 [DE] Fed. Rep. of Germany ....... 2612171

[51] Int. Cl.² .................................................. F24J 3/02
[52] U.S. Cl. ..................................... 126/270; 126/271
[58] Field of Search ............... 126/270, 271; 237/1 A; 350/1; 60/641; 136/89

[56] References Cited

U.S. PATENT DOCUMENTS

| 1,801,710 | 4/1931 | Abbot | 126/271 |
| 1,989,999 | 2/1935 | Niederle | 126/271 |
| 2,133,649 | 10/1938 | Abbot | 126/271 |
| 2,213,894 | 9/1940 | Barry | 126/271 |
| 3,227,153 | 1/1966 | Godel et al. | 126/271 |
| 3,957,029 | 5/1976 | Nozik | 126/270 |
| 3,981,293 | 9/1976 | Gillery | 126/271 |
| 3,985,119 | 10/1976 | Oakes, Jr. | 126/271 |
| 4,010,732 | 3/1977 | Sawata et al. | 126/271 |

Primary Examiner—Albert W. Davis, Jr.
Assistant Examiner—James C. Yeung
Attorney, Agent, or Firm—Thomas A. Briody; William J. Streeter; Rolf E. Schneider

[57] ABSTRACT

A solar collector comprising an evacuated, transparent cover tube sealed at its ends and an associated selective absorber, the inner surface of at least one end of the cover tube being provided with a metallic reflective layer.

6 Claims, 4 Drawing Figures

SOLAR COLLECTOR COMPRISING AN EVACUATED ABSORBER COVER TUBE

This invention relates to a solar collector, comprising an evacuated, transparent cover tube which is sealed at its ends and which is provided with a selective heatreflective layer on its inner surface along its entire cylindrical length and over a cross-sectional area of at least 180° and which is associated with a selective absorber.

Solar collectors serve to convert the major part of the radiation spectrum of sunlight into heat and to transfer the heat to a transport medium, for example, water.

In order to obtain high efficiency, solar collectors should have the following properties as much as possible:

(a) good absorption (absorption factor $\alpha \geq 0.9$) over the whole solar spectrum ($\lambda = 0.3$ to 2 $\mu m$).

(b) low emission (emission factor $\epsilon \leq 0.3$) in the range of heat radiation ($\lambda = 3$ to 30 $\mu m$).

(c) low heat losses due to heat conduction and convection.

(d) low thermal capacity.

In this respect a selective heat reflective layer is to be understood to mean a layer which is transparent to sunlight (0.3 to 2 $\mu m$) and reflective of heat radiation (3 to 30 $\mu m$) and which has an emission factor $\epsilon \leq 0.3$ and a reflective capacity for heat radiation $R > 0.7$ where ($\epsilon = 1-R$). Heat reflective layers of this kind may be made of gold, silver, tin dioxide or preferably of tin-doped indium oxide. For sunlight (0.3 to 2 $\mu m$) selective absorbers have an absorption factor $\alpha \geq 0.85$, and for heat radiation (3 to 30 $\mu m$) an emission factor $\epsilon < 0.15$. Selective absorbers of this kind may be made, for example, of nickel oxide or copper oxide or of cobalt sulphide.

In non-selective absorbers, $\alpha \, \delta \, \epsilon \geq 0.85$. Non-selective absorbers of this kind are made, for example, of black glass enamel.

Solar collectors of the kind set forth are known in which a U-shaped absorber is sealed in an evacuated glass cover tube. Also known are solar collectors in which a flat absorber is covered by a number of adjoining and contacting evacuated glass tubes. During manufacture, the cover tubes, provided with a selective heat reflective layer in their cylindrical zones, are sealed at their ends, so that their end faces remain free from any layer whatsoever. However, because the known solar collector with a sealed internal absorber radiates heat from the end sealing faces of the cover tube, and because the other known solar collector with various cover tubes over a flat absorber transfers part of its heat to the lower halves of the cover tubes, so that this heat ultimately reaches the noncoated ends of the cover tubes by heat conduction, and is subsequently radiated to the upper half of the ends of the cover tubes, the ends of the cover tubes which are not provided with a layer cause heat losses by radiation. Because glass has a high emission factor, radiation losses of this kind are comparatively high, the more so because the ends of the cover tubes which are not provided with a layer represent 5 to 10% of the total surface area of the cover tubes.

The invention has for its object to eliminate such radiation losses through the ends of the cover tubes.

This is achieved in a solar collector of the kind set forth in that at least one end of the cover tube is provided with a metallic reflective layer on its inner surface.

As a result of the provision of a reflective layer on the end face of the cover tube, the heat radiation originating from the absorber either is not at all taken up by the cover tube or is not radiated by this tube. In a solar collector comprising an internal absorber, it is sufficient to provide a reflective layer only on the end face of the cover tube wherethrough the internal absorber has been introduced into the cover tube. The cover tube may also be of a double-walled type.

The reflective layer is preferably made of a metal or metal alloy having a low thermal emission factor, such as gold, silver, aluminium, lead or copper. A metal or a metal alloy having a low heat emission has an emission factor $\epsilon < 0.05$. The reflective layer may consist of a baked noble metal. Layers of this kind can be deposited prior to final assembly of the solar collectors.

However, the reflective layer is preferably deposited on the end faces only after the evacuation and the sealing of the cover tube. To this end, in a preferred embodiment of the solar collector in accordance with the invention, a quantity of metal which can be made to evaporate by external heating is preferably provided in the cover tube in the vicinity of at least one of the ends. When reflectors which extend transversely of the axis of the tube are provided at the ends of the cylindrical portion of the cover tube, the metal to be evaporated is provided on the sides of the reflectors which are remote from the cylindrical portion.

The invention will now be described in detail hereinafter with reference to two embodiments which are diagrammatically shown in the accompanying drawings, in which.

Figure 1:
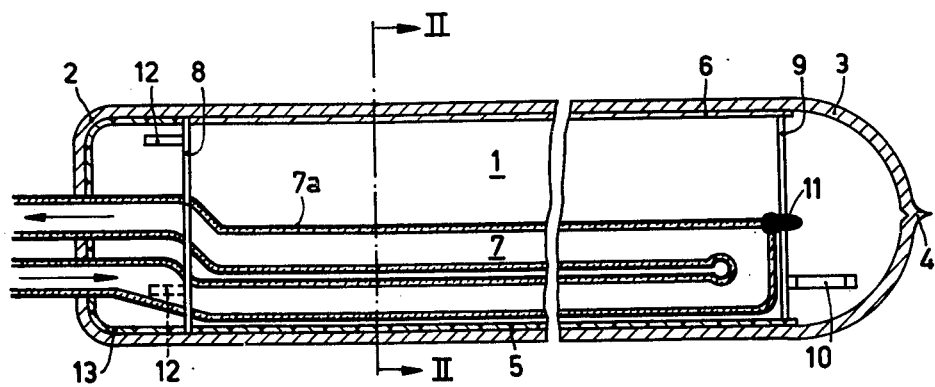
FIG. 1 is a longitudinal sectional view of a solar collector in accordance with the invention.
Figure 2:
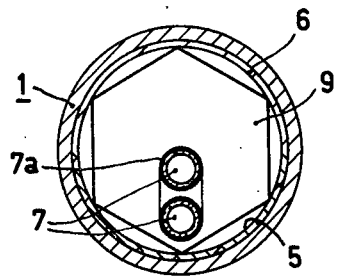
FIG. 2 is a cross-sectional view, taken along the line II—II, of the solar collector shown in FIG. 1.

The solar collector shown in FIGS. 1 and 2 comprises a transparent cover tube 1 which is made of glass and which is sealed at its ends, more or less domeshaped end faces 2 and 3 thus being formed. On the end face 3 there is situated a sealing pumping stem 4 wherethrough the interior of the cover tube 1 has been evacuated to a residual gas pressure of less than 1 millibar. The cover tube 1 is provided with an internal reflective layer 5 of vapour-deposited silver along its entire cylindrical length and over a cross-sectional area of 180°. Furthermore, above the reflective layer 5 the cover tube 1 is provided on its inner surface, in the cylindrical zone, with a selective heat-reflective layer 6 which consists of tin-doped $In_2O_3$.

In the end face 2 of the cover tube 1 a tubular absorber 7 of glass or metal is sealed in a vacuum-tight manner; this absorber has a U-shaped construction and serves to accommodate a transport medium, for example, water, which is to be heated by solar radiation. The central plane of the absorber 7 which extends through the axes of the U-tube is arranged in the plane of symmetry of the interior reflective layer 5, between the axis of the cover tube and the interior reflective layer. In the cylindrical zone of the cover tube 1, the absorber includes a black surface layer 7a which consists, for example, of black glass enamel.

The absorber 7 is maintained in position in the cover tube 1 by means of two flat reflectors 8 and 9. The reflectors extend on both ends of the cylindrical portion of the cover tube, transversely of the tube axis, and are made of mica with a vapour-deposited aluminium layer. The reflector 9 furthermore carries a getter ring 10. A glass mandril 11 which engages the reflector 9 in a supporting manner is fused to the rearmost end of the absorber 7.

The basic material used for the manufacture of such a solar collector is an open glass tube having a round section, the interior of the said tube first being provided with the layers 5 and 6. The absorber 7 is sealed in on one end of the glass tube. After the mounting of the reflectors 8 and 9, the other end of the tube is closed, and the tube is evacuated and subsequently sealed.

In order to avoid heat losses from the end face 2, two quantities metal 12 of, for example, aluminium, lead or copper, are provided on the reflector 8. After evacuation of the cover tube 2, it is externally heated by induction in the region of the quantities of metal 12, with the result that the metal 12 evaporates and is deposited as a metallic reflective layer 13 on the end face 2 of the cover tube 1. The evaporated metal is at the same time also deposited on the absorber tube 7 in the region between the reflector 8 and the end face 2. This is desirable to prevent heat radiation from the absorber tube in this region.

Figure 3:
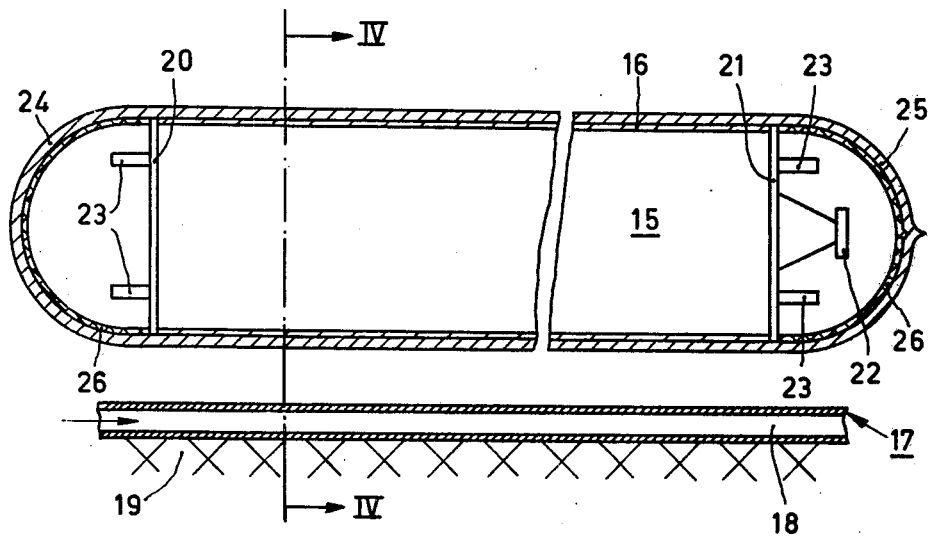
FIG. 3 is a longitudinal section view of another solar collector in accordance with the invention.
Figure 4:
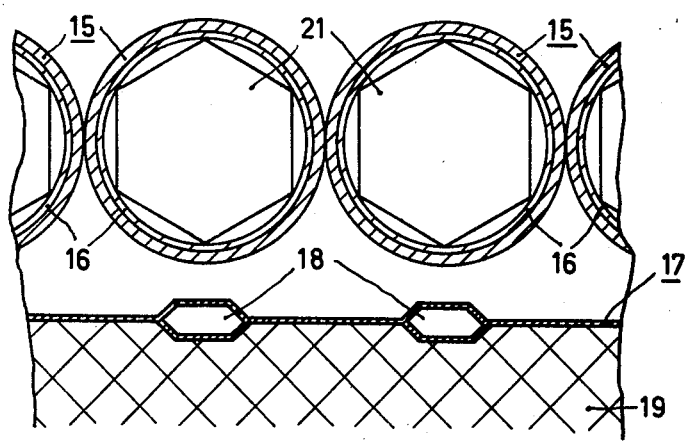
FIG. 4 is a cross-sectional view, taken along the line IV—IV, of the solar collector shown in FIG. 3.

The solar collector shown in FIGS. 3 and 4 comprises several evacuated glass tubes 15 which are adjacently arranged in contact with each other and whose ends are sealed. The glass tubes 15 may be arranged loosely one against the other or may be interconnected by means of glue or fusion. On their inner surface the glass cover tubes 15 are provided all around with a selective heat-reflective layer 16 which consists, for example, of tin-doped $In_2O_3$. This layer 16 extends only along the cylindrical region of the cover tubes 15 for manufacturing-technical reasons.

The absorber 17 covered by these tubes 15 consists of blackened metal plates which have been cold-welded under pressure, the said plates comprising channel-like ducts 18 for the heat transport medium, for example, water. The absorber 17 may also be provided with a selective absorber layer. The absorber is heat-insulated on its other side by means of an insulating material 19.

At the ends of the cylindrical portion of the cover tube 15 there are provided reflectors 20 and 21 which extend transversely of the axis of the cover tube and which are made of mica with a vapour-deposited aluminium layer. A getter ring 22 is connected to the reflector 21. Furthermore, in contact with the reflectors 20 and 21 small quantities of metal 23, for example, lead are provided; these quantities are evaporated by external induction heating after the manufacture of the evacuated cover tube 15. A reflective layer 26 of lead is then deposited on the dome-shaped end faces 24 and 25 of the cover tubes, the said layer preventing heat radiation inside the cover tube.

In a practical embodiment of a solar collector as shown in FIGS. 3 and 4, the diameter of the glass cover tubes 14 amounted to 65 mm, the wall thickness to 1.2 mm and the length to 100 cm. The selective heat-reflective layer 16, made of indium oxide, had a thickness of 0.3 micron. The absorber 17 had a black cover layer (for example, aquaduct) having a thickness of approximately 0.2 mm, an absorption factor $\alpha = 0.95$ and an emission factor $\epsilon = 0.8$. The distance between the cover tubes 15 and the absorber 17 amounted to 20 mm. The lead reflective layer 26 had a thickness of 0.1 micron. When use is made of these cover tubes 15 with a reflective layer on their ends, a reduction in heat loss of 20% is achieved in comparison with cover tubes comprising uncoated end faces.

What is claimed is:

1. A solar collector, which comprises an evacuated, transparent essentially straight cover tube substantially circular in cross-section and sealed at its ends, a selective absorber associated with said cover tube, a selective heat-reflective layer provided on the inner surface of said cover tube along its entire cylindrical length and over a cross-sectional area of at least 180°, and a metallic reflective layer provided on the inner surface of at least one end of the cover tube.

2. A solar collector according to claim 1, in which the metallic reflective layer has a low thermal emission factor.

3. A solar collector according to claim 2, in which the metallic reflective layer is formed of gold, silver, aluminum, lead or copper.

4. A solar collector according to claim 1, in which the metallic reflective layer is formed of a baked noble metal.

5. A solar collector according to claim 1, in which the selective absorber comprises a U-shaped tube extending into the cover tube through said one end, said U-shaped tube being in sealing engagement with said one end.

6. A solar collector according to claim 1, in which the selective absorber comprises a flat plate arranged below said cover tube, said flat plate being provided with one or more tubular channels.

* * * * *